No. 810,098. PATENTED JAN. 16, 1906.
T. P. WALTER.
CORN HUSKER.
APPLICATION FILED MAR. 28, 1905.
2 SHEETS—SHEET 1.
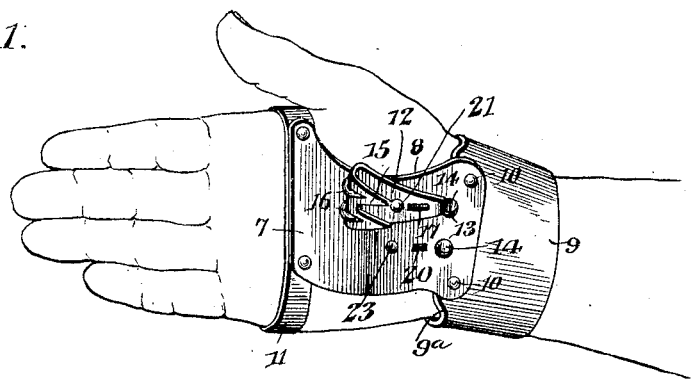
Fig. 1.
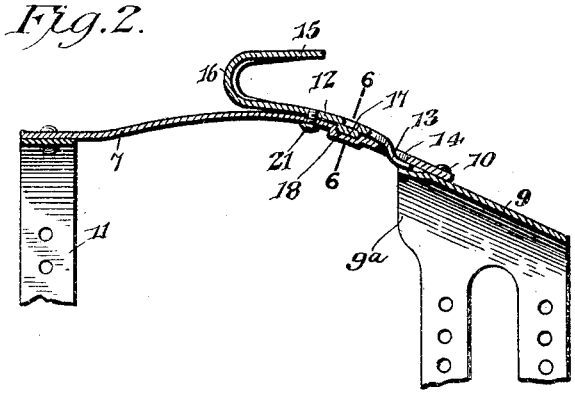
Fig. 2.
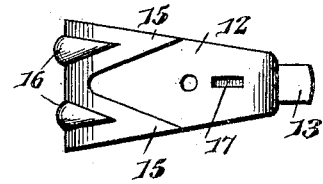
Fig. 4.
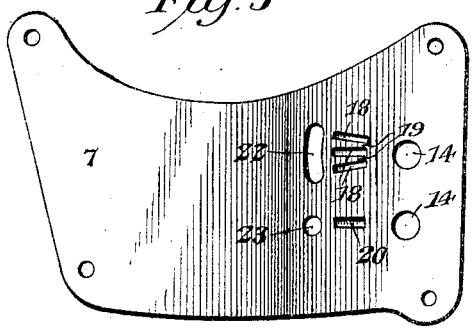
Fig. 3.
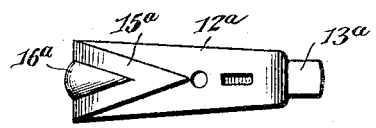
Fig. 5.
Fig. 6.
Theophiel Paul Walter, Inventor
Witnesses
Jas. K. McCathran
B. G. Foster
By C. G. Siggers
Attorney

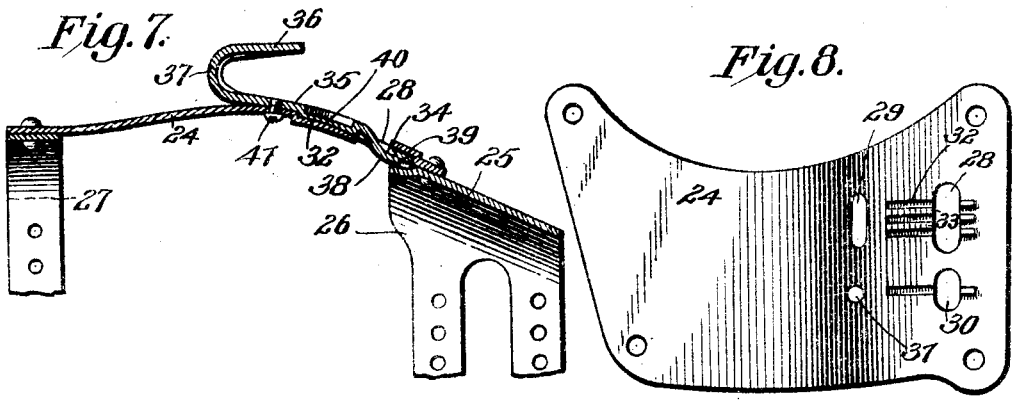
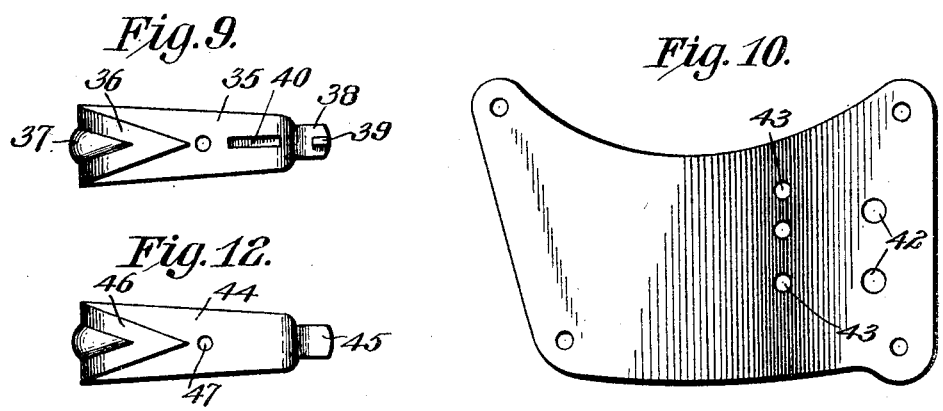
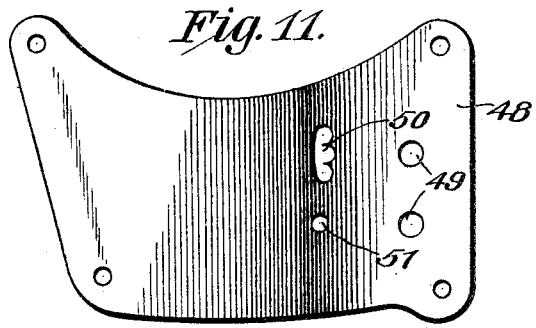

UNITED STATES PATENT OFFICE.

THEOPHIEL PAUL WALTER, OF BEATRICE, NEBRASKA, ASSIGNOR TO THE BEATRICE MANUFACTURING COMPANY, OF BEATRICE, NEBRASKA, A CORPORATION OF NEBRASKA.

CORN-HUSKER.

No. 810,098.     Specification of Letters Patent.     Patented Jan. 16, 1906.

Application filed March 28, 1905. Serial No. 252,481.

*To all whom it may concern:*

Be it known that I, THEOPHIEL PAUL WALTER, a citizen of the United States, residing at Beatrice, in the county of Gage and State of Nebraska, have invented a new and useful Corn-Husker, of which the following is a specification.

This invention relates to improvements in that class of devices which are worn upon the hand and are employed for stripping husks from the ears of corn.

The object is to provide a novel structure of a simple nature which will properly conform to the shape of the hand, will permit the unrestricted movement of the same, and, furthermore, has a husk-engaging hook member readily adjustable toward and from the thumb, so that it may be placed in practically any position deemed desirable by the operator.

In the accompanying drawings, Figure 1 is a perspective view of one embodiment of the husker shown applied to the hand. Fig. 2 is a longitudinal sectional view of said husker, the same being on an enlarged scale to that shown in Fig. 1. Fig. 3 is a plan view of the base member or plate. Fig. 4 is a similar view of the husk-engaging member shown in Fig. 1. Fig. 5 is a plan view of a slightly-modified form of husk-engaging member. Fig. 6 is a detail sectional view on the line 6 6 of Fig. 2. Fig. 7 is a sectional view through a modified embodiment of the invention. Fig. 8 is a plan view of the base member of said modification. Fig. 9 is a similar view of the husk-engaging member. Fig. 10 is a plan view of a still further modification of the base member. Fig. 11 is another embodiment of said base member. Fig. 12 is a plan view of a husk-engaging member adaptable for use in connection with the base members illustrated in Figs. 10 and 11.

Similar reference-numerals designate corresponding parts in all the figures of the drawings.

In the embodiment illustrated a base member 7 is employed, which is preferably formed of sheet metal and conforms substantially to the configuration of the inner portion of the palm of the hand, being provided with an incut portion 8, that receives the base of the thumb, as shown in Fig. 1. A wrist-strap 9 is provided on its inner margin with an extension-flap 9ª, that is suitably secured, as shown at 10, to the inner end of the base member, said wrist-strap being adapted to be buckled in the usual manner upon the wrist. It will be observed that the end of the base member is located upon the wrist-strap so that when the hand is bent the wrist will be protected from the end edge by the strap and the extension-flap, moreover, will act as a hinge to permit the bending of the wrist without material interference, as will be apparent. To the other end of the base member is secured a palm-strap 11, which surrounds and is suitably buckled upon the hand.

A husk-engaging member is employed that is preferably formed of a single piece of sheet metal and comprises a body portion 12, having at one end an inset and longitudinally-disposed retaining-terminal 13, that is adapted to engage in either of a pair of openings 14, said terminal 13 constituting a pivot to permit the swinging movement of the husk-engaging member with respect to the base member. The end of the body portion opposite that carrying the retaining-pivot extension is provided in the structure shown in Figs. 1, 2, and 4 with a pair of outstanding integral tapering hooks 15, that are reinforced, strengthened, or stiffened by longitudinally-disposed ribs 16, located at the bends of said hooks and struck from the material thereof. The husk-engaging member is preferably provided on its body portion with an inset integral tooth 17, formed by suitably upsetting the metal, and this tooth is arranged to be received in any of a plurality of sockets 18, disposed radially with respect to one of the pivot-openings 14, the sockets 18 being spaced apart in order to form integral tooth portions 19 between them. The tooth is, furthermore, adapted to be received in a socket 20, arranged alongside the other opening 14.

For the purpose of securing the husk-engaging member against its pivotal movement a holding-screw 21 is employed, which is arranged to be passed either through a slot 22, disposed concentric to one of the openings 14, or through an opening 23, arranged at one side of the other opening, said screw being threaded into the body 12 of the husk-engaging member at one side of the integral tooth.

The husker, as will be apparent, is adapted to be used in the well-known manner, being strapped to the hand. It will be observed that the movement of the hand is not interfered with, as the fingers and thumb are entirely free, and the wrist may be bent in the ordinary manner, because of the hinge extension-flap 9ª. It will also be seen that the husk-engaging device can be arranged at different distances from the thumb, and when the pivot is located in the pivot-receiving opening that is disposed nearest said thumb the hook can be swung to different positions and securely locked. Instead of a double hook, as shown in Fig. 4, a single one, 15ª, may be employed, carried by a body 12ª, which has the same pivotal extension 13ª, and said hook is also reinforced by a strengthening or stiffening rib 16ª. This stiffening-rib is an important feature, as it permits the use of sheet metal for the hook and yet makes said hook rigid and stiff, so that it will not become misshapen.

In Figs. 7, 8, and 9 there is illustrated an embodiment of the invention having several important features. The base member 24 is of substantially the same shape as that illustrated in Fig. 3 and has secured to one end a wrist-strap 25, provided with a flap extension 26, while to the other end is fastened a palm-strap 27. In one end portion of the base member are formed parallel slots 28 and 29, and at the outer ends thereof are located openings 30 and 31. Between the slots 28 and 29 are formed in the outer face of the base member a plurality of parallel sockets 32, forming teeth 33 between them, and on the opposite side of the slot 28 and in the inner or under face of the base member are formed other sockets 34, alined with the sockets 32. The husk-engaging member consists of a sheet-metal body-plate 35, having at one end an outturned hook 36, stiffened or strengthened by means of an integral rib 37, said body portion being provided at its other end with the usual offset longitudinally-disposed retaining lug or terminal 38. The terminal 38 is adapted to be passed through the slot 28 and has an outstanding tooth 39, arranged to engage in any of the sockets 34. The body portion 35 of the husk-engaging member has an inwardly-extending tooth 40, arranged to engage in the sockets 32. A yielding screw 41 is passed through the slot 29 of the base member and is threaded into the body portion of the husk-engaging member. Thus it will be seen that the husk-engaging member is adjustable upon the base member toward and from the thumb and without changing its angular disposition upon the base member. This is an important feature, as it permits a straight pull upon the husks, whether the hook is located close to or distant from the thumb. It will of course be understood that if it is desired to place the hook at a greater distance from the thumb than is permitted by the adjustment of the parts in the slots 28 and 29 the husk-engaging member can be detached from the base member and reëngaged in the openings 30 and 31.

In Fig. 10 another modification of the base is shown. The shape and configuration of said base is substantially the same as that already described; but sets of openings 42 and 43 are employed. A hook or husk-engaging member for this type of structure is illustrated in Fig. 12, wherein it will be seen that a body portion 44 is employed having at one end an offset longitudinally-disposed retaining terminal or lug 45, that engages in the openings 42, the other end of said body portion having the usual outstanding hook 46. A retaining-screw is adapted to be passed through any of the openings 43 and threaded into an opening 47 in the body of the hook. This same hook is also adapted for use in connection with the embodiment illustrated in Fig. 11, wherein the base member is designated 48 and has openings 49 to receive the retaining terminal or lug 45. In connection with one of these openings there is employed a slot 50, adapted to receive the holding-screw that is threaded into the opening 47, and coacting with the other opening 49 is a single opening 51. It will of course be clear that these two latter structures can be substituted for those already described. They are simpler than the first two embodiments, but do not have the same interlocking action caused by the interfitting teeth.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a corn-husker, the combination with a base member having a pivot-receiving opening, a plurality of sockets disposed radially with respect to said opening, and a slot arranged concentric to said opening, of a husk-engaging member comprising a body having at one end a pivot that engages in the pivot-receiving opening and at its other end an outstanding husk-engaging hook, said body, furthermore, being provided with an inset tooth that engages in the sockets, and holding means passing through the slot of the base member and engaging the body of the husk-engaging member.

2. In a corn-husker, the combination with a base member having an opening, of a husk-engaging member having an offset longitudinally-extending element at one end that engages in the opening and interlocks with the base member and an outstanding hook at its other end, and a device detachably engaging the husk-engaging member between its ends and between the hook and interlocked element, said device engaging the base member and holding the husk-engaging member against movement thereon.

3. In a corn-husker, the combination with a base member, of a husk-engaging member having a substantially flat body portion that rests against the base member and is provided with an outstanding curved hook at one end, the curved portion of said hook having a longitudinally-disposed strengthening-rib that terminates at the body portion to permit the same to lie upon the base member, and means for securing the husk-engaging member to the base member.

4. In a corn-husker, the combination with a base member having an opening, of a husk-engaging member having a substantially flat body portion that rests against the base member and is provided at one end with a longitudinally-extending element that engages in the opening and interlocks with the base member, said body portion being provided at its opposite end with an outstanding curved hook overhanging the body portion and terminating short of the longitudinally-extending element, said hook having a longitudinally-disposed strengthening-rib that terminates at the body portion to permit of the same lying upon the base member, and a device engaging the body portion and the base member to hold the former against movement on the latter.

5. In a corn-husker, the combination with a base member having a pivot-receiving opening, a plurality of sockets disposed radially with respect to said opening and a slot arranged concentric to said opening, of a husk-engaging member comprising a body having at one end a pivot that engages in the pivot-receiving opening and at its other end an outstanding husk-engaging hook, said body being furthermore provided with an inset tooth that engages in the sockets, and a holding-screw passing through the slot of the base member and engaging the body of the husk-engaging member.

6. In a corn-husker, the combination with a base member, of a husk-engaging member, one of said members having a plurality of sockets, the other having a tooth that engages in the sockets, a pivotal connection between the members, and means separate from the pivotal connection and connecting the members at one side thereof for holding the tooth in different sockets and the husk-engaging member against pivotal movement on the base member.

7. In a corn-husker, the combination with a base member having an opening and a socket, of a husk-engaging member comprising a body-plate having an offset integral lug at one end that engages in the opening, an outstanding integral hook at the other end, and an intermediate integral tooth that fits in the socket, and means independent of the lug and connecting the plate and base member at one side of said lug to hold the same against relative movement.

8. In a corn-husker, the combination with a base member, of a husk-engaging member mounted thereon and comprising a sheet-metal body-plate having an outstanding curved and overhanging hook, the curved portion of said hook being provided with a longitudinally-disposed stamped strengthening or stiffening rib that terminates short of the body-plate and the end of the hook.

9. In a corn-husker, the combination with a base member having an opening, of a husk-engaging member comprising a body portion that rests against the base member, said husk-engaging member having a longitudinally-disposed offset retaining-lug that projects beyond one end of the body portion and is movable through the opening into and out of engagement with the opposite side of the base member to that against which the body portion rests, and having at its other end an outstanding hook that extends toward the end having the lug, and a holding device connecting the base member and the body portion between the retaining-lug and the hook.

10. In a corn-husker, the combination with a wrist-strap having an extension-flap at one of its side margins, of a base secured to one end of the strap and extending over the flap, a palm-strap secured to the other end of the base, said base having an opening, a husk-engaging member comprising a body portion having an offset terminal retaining-lug that projects beyond the body portion and engages in the opening of the base, an outstanding hook located at the other end of the body portion and having a longitudinally-disposed stiffening-rib between its side edges, and a holding device connecting the body portion and the base.

In testimony that I claim the foregoing as my own I have hereto affixed my signature in the presence of two witnesses.

THEOPHIEL PAUL WALTER.

Witnesses:
PETER PENNER,
W. A. PENNER.